US009083817B2

(12) United States Patent
Jan et al.

(10) Patent No.: US 9,083,817 B2
(45) Date of Patent: Jul. 14, 2015

(54) METHOD FOR CONTROLLING SURROUNDING DEVICE AND COMMUNICATION DEVICE AND COMPUTER-READABLE MEDIUM USING THE SAME

(75) Inventors: Cheng-Shiun Jan, Taoyuan County (TW); Chun-Hsiang Huang, Taoyuan County (TW); Wei-Chung Yang, Taoyuan County (TW); Ching-Liang Chiang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1153 days.

(21) Appl. No.: 13/050,946

(22) Filed: Mar. 18, 2011

(65) Prior Publication Data

US 2011/0230235 A1    Sep. 22, 2011

Related U.S. Application Data

(60) Provisional application No. 61/315,407, filed on Mar. 19, 2010.

(51) Int. Cl.
*H04M 3/00* (2006.01)
*H04M 1/725* (2006.01)
*H04M 19/04* (2006.01)

(52) U.S. Cl.
CPC ........ *H04M 1/72569* (2013.01); *H04M 19/042* (2013.01)

(58) Field of Classification Search
CPC ....................................................... H04M 3/00
USPC ......................................................... 455/420
See application file for complete search history.

(56) References Cited

U.S. PATENT DOCUMENTS 8,548,523 B2 * 10/2013 Belz et al. ...................... 455/557

FOREIGN PATENT DOCUMENTS

| CN | 2679945   | 2/2005  |
| CN | 1980055   | 6/2007  |
| CN | 101263703 | 9/2008  |
| CN | 201230344 | 4/2009  |
| CN | 101552595 | 10/2009 |
| CN | 101562671 | 10/2009 |
| DE | 19834147  | 2/2000  |
| DE | 20217689  | 1/2003  |

OTHER PUBLICATIONS

"First Office Action of China Counterpart Application", issued on Jan. 4, 2013, p. 1-p. 10.

(Continued)

*Primary Examiner* — Huy C Ho
(74) *Attorney, Agent, or Firm* — Jianq Chyun IP Office

(57) ABSTRACT

A method for controlling a surrounding device and a communication device and a computer-readable medium using the same are proposed. The proposed method is adapted for a communication device, and includes following procedures. Firstly, a connection with a surrounding device is established through a wireless communication function. Then, a target setting value associated with a setting of the surrounding device is stored. Further, it is determined whether the communication device receives a communication request. Moreover, when the communication device receives the communication request, the setting of the surrounding device is modified from an original setting value to the target setting value.

20 Claims, 9 Drawing Sheets

(56) References Cited

OTHER PUBLICATIONS

"Office Action of China Counterpart Application", issued on Jan. 23, 2014, p. 1-p. 8.

"Second Office Action of China Counterpart Application", issued on Aug. 2, 2013, p. 1-p. 11.

"Office Action of Deutch Counterpart Application", issued on Apr. 30, 2014, p. 1-p. 11.

* cited by examiner

METHOD FOR CONTROLLING SURROUNDING DEVICE AND COMMUNICATION DEVICE AND COMPUTER-READABLE MEDIUM USING THE SAME

CROSS-REFERENCE TO RELATED APPLICATION

This application claims the priority benefits of U.S. provisional application No. 61/315,407, filed on Mar. 19, 2010. The entirety of the above-mentioned patent application is hereby incorporated by reference herein and made a part of this specification.

BACKGROUND

1. Field of the Invention

The invention relates to a method for controlling a surrounding device. Particularly, the invention relates to a method for controlling a surrounding device, and a communication device and a computer-readable medium using the same.

2. Description of Related Art

When a user answers a phone call, an audio volume of a surrounding device is generally required to be lowered, an operation setting of the surrounding device is required to be adjusted or the surrounding device is required to be even turned off. For example, when the user receives a phone call while watching a television (TV) program, the user generally pauses a playing state of the TV program and probably lowers an audio volume of the TV set to prevent the TV program from influencing an action (for example, answering the phone call) performed in response to a call notification (which is a communication request herein). For another example, when the user receives a phone call while listening to music, the user generally pauses a playing state of a music player (or example, an audio device or a multimedia player) or probably lowers an audio volume of the music player to prevent the music player from influencing an action performed in response to the communication request. The above processing method is probably required to simultaneously adjust operation setting values of a plurality of surrounding devices, which may easily cause utilization inconvenience. Therefore, how to automatically and effectively reduce the influence of the surrounding device on the action performed in response to the communication request is an important issue to be developed.

SUMMARY

Accordingly, the invention is directed to a method for controlling a surrounding device and a communication device and a computer-readable medium using the same. By establishing a connection with the surrounding device, setting a target setting value, storing an original setting value when a communication request is received, performing a checking procedure of the setting value, and determining whether or not to modify the original setting value to the target setting value according to a checking result, influence of the surrounding device on an action performed by a user in response to the communication request is effectively reduced.

An example of the invention provides a method for controlling a surrounding device. The method is adapted for a communication device, and includes following steps. Firstly, a connection with a surrounding device is established through a wireless communication function. Then, a target setting value associated with a setting of the surrounding device is stored. Further, it is to determine whether the communication device receives a communication request. Moreover, when the communication device receives the communication request, the setting of the surrounding device is modified from an original setting value to the target setting value.

An example of the invention provides a communication device, which is adapted for controlling a surrounding device. The communication device includes communication module, a setting module, a storage unit and a determination module. The communication module establishes a connection with the surrounding device through a wireless communication function. The storage unit is configured for storing a target setting value associated with a setting of the surrounding device. The determination module is configured for determining whether the communication device receives a communication request. The setting module is connected to the communication module, the storage unit and the determination module. When the determination module determines that the communication device receives the communication request, the setting module modifies the setting of the surrounding device from an original setting value to the target setting value stored in the storage unit.

An example of the invention provides a computer-readable medium, which includes computer executable program, and when the computer executable program is loaded to a communication device, the communication device executes following operations. Firstly, a connection with a surrounding device is established through a wireless communication function. Then, a target setting value associated with a setting of the surrounding device is stored. Further, it is to determine whether the communication device receives a communication request. Moreover, when the communication device receives the communication request, the setting of the surrounding device is modified from an original setting value to the target setting value.

According to the above descriptions, examples of the invention provide the method for controlling the surrounding device and the communication device and the computer-readable medium using the same. A connection with the surrounding device is established through a wireless communication function and a target setting value is set. When a communication request is received, by setting the target setting value, storing an original setting value and performing a checking procedure of the setting values, and determining whether or not to modify the original setting value to the target setting value according to a checking result, influence of the surrounding device on an action performed by the user in response to the communication request is effectively reduced.

In order to make the aforementioned and other features and advantages of the invention comprehensible, several examples accompanied with figures are described in detail below.

BRIEF DESCRIPTION OF THE DRAWINGS

The accompanying drawings are included to provide a further understanding of the invention, and are incorporated in and constitute a part of this specification. The drawings illustrate examples of the invention and, together with the description, serve to explain the principles of the invention.

DESCRIPTION OF DISCLOSED EMBODIMENTS

Figure 1:
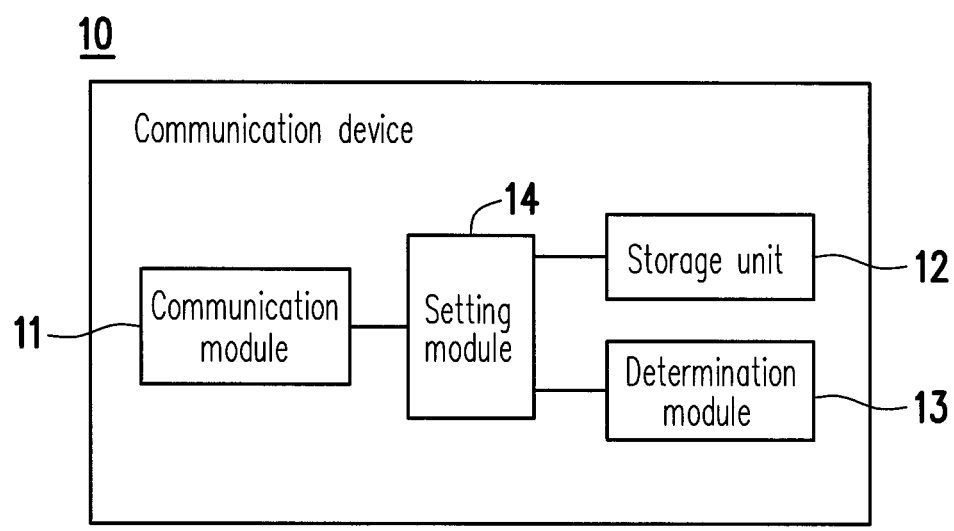
FIG. 1 is a functional block diagram of a communication device according to an example of the invention.

FIG. 1 is a functional block diagram of a communication device 10 according to an example of the invention. The communication device 10 is, for example, a multimedia player, a handheld gaming device, a mobile phone, a mobile navigation device, a personal digital assistant (PDA), a PDA phone, a smart phone, an e-book, a computer, a notebook computer, a flat panel computer, a set-top box (STB) or any handheld device with communication function.

Referring to FIG. 1, the communication device 10 at least includes a communication module 11, a storage unit 12, a determination module 13 and a setting module 14.

The communication module 11 includes an antenna module and a transceiver unit, which supports a wireless communication function for establishing a connection with a surrounding device. The surrounding device is, for example, a television, an audio device, an electromagnetic oven, a vacuum cleaner or a gas stove. The wireless communication function supports a wireless area network standard, an IEEE 802.11 standard, a wireless fidelity certification standard (Wi-Fi™), an ultra wide band technology, or a bludetooth standard (Bluetooth™).

The storage unit 12 is configured for storing a target setting value associated with a setting of the surrounding device. The storage unit 12 includes any type of fixed or removable random access memory (RAM), read-only memory (ROM), flash memory, hard disk or other similar devices.

The determination module 13 is connected to the setting module 14, and is configured for determining whether the communication device 10 receives a communication request. The communication request is, for example, a call notification of a wireless communication system, a call notification of a network phone system, or a call notification of a phone system based on a session initial protocol (SIP). The wireless communication system can support a worldwide interoperability for microwave access (WiMAX™) standard, a code division multiple access (CDMA) standard, a wideband code division multiple access (WCDMA™) standard, a WiMAX-advanced standard, a Third generation partnership project long term evolution (3GPP LTE™) standard, or a 3GPP LTE-advanced standard.

The setting module 14 is connected to the communication module 11, the storage unit 12 and the determination module 13. When the determination module 13 determines that the communication device 10 receives a communication request, the setting module 14 modifies the setting of the surrounding device from an original setting value to the target setting value stored in the storage unit 12.

In other examples of the invention, the communication device 10 may further include an input module (for example, a touch panel or control buttons) or an output module (for example, an audio output module or a video display module), etc., though the other possible components of the communication device 10 are not described in detail in the invention.

Figure 2:
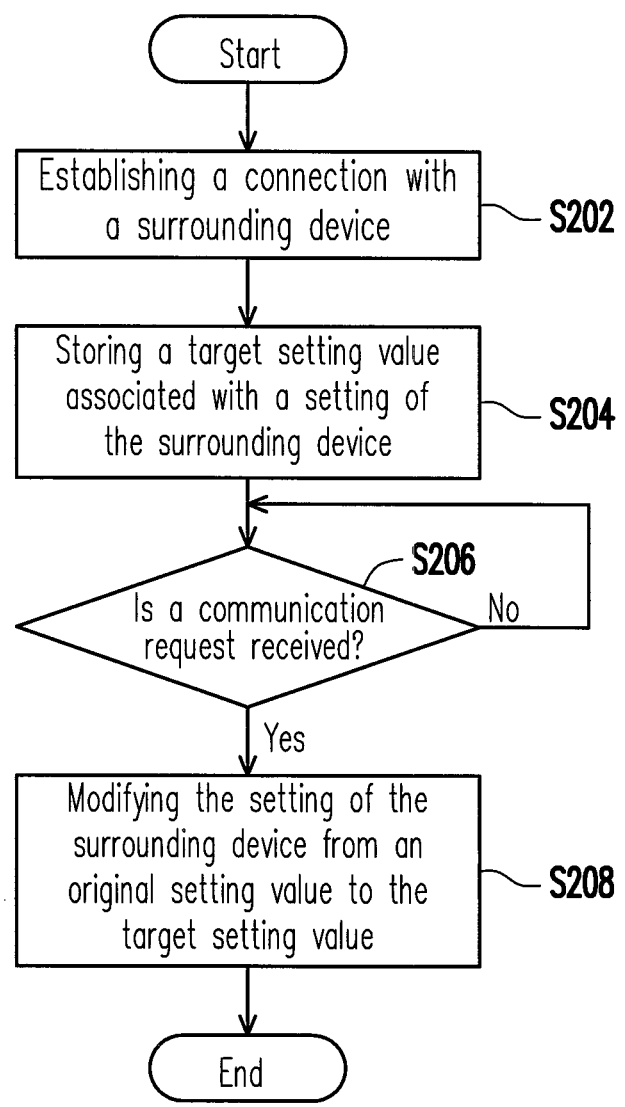
FIG. 2 is a flowchart illustrating a method for controlling a surrounding device according to a first example of the invention.

FIG. 2 is a flowchart illustrating a method for controlling a surrounding device according to a first example of the invention. Referring to FIG. 1 and FIG. 2, the method for controlling the surrounding device is started from a step S202. First, the setting module 14 establishes a connection with the surrounding device through a wireless communication function of the communication module 11 (the step S202). Then, the storage unit 12 stores a target setting value associated with a setting of the surrounding device (step S204). Then, the determination module 13 determines whether the communication device 10 receives a communication request (step S206).

If the determination module 13 determines that the communication device 10 does not receive the communication request, the step S206 is returned. If the determination module 13 determines that the communication device 10 receives the communication request, a step S208 is executed. In the step S208, the setting module 14 modifies the setting of the surrounding device from an original setting value to the target setting value stored in the storage unit 12. The target setting value can be a predetermined value, or can be determined by the user.

In another example of the invention, after the determination module 13 has determined that the communication device 10 receives a communication request, the determination module 13 further determines whether a phone call connection is successfully established by the user (i.e., the user answers the phone call), and the setting module 14 modifies the setting of the surrounding device only when the phone call connection is successfully established. On the contrary, when a phone call connection is not successfully established (i.e., the user hangs up the phone call or the user does not answer the phone call), the setting of the surrounding device is not modified.

In a practical implementation, the communication device 10 can simultaneously establish connections with one or a plurality of surrounding devices, so as to reduce the influence of the surrounding device on the action performed in response to the communication request.

For example, in an example, the setting can be an audio volume setting, and the target setting value can be a mute setting. In detail, when the determination module 13 determines that the communication device 10 receives a call notification, the setting module 14 modifies the audio volume setting of a surrounding audio device and/or television (i.e. the surrounding device) from the original setting value to the mute setting. In another example, the target setting value can be a user setting volume, namely, when the determination module 13 determines that the communication device 10 receives a call notification, the setting module 14 modifies the audio volume setting of the surrounding audio device and/or television from the original setting value to the user setting volume.

In another example, the setting can be a play setting, and the target setting value can be a pause play state. In detail, when the determination module 13 determines that the communication device 10 receives a call notification, the setting module 14 modifies the play setting of the surrounding audio device and/or television (i.e. the surrounding device) from the original setting value (for example, a playing state, a fast forward state, a fast rewind state or any other setting values) to the pause play state.

In another example, the setting can be a state setting, and the target setting value can be a busy state or a leave state. In detail, when the determination module 13 determines that the communication device 10 receives a call notification, the setting module 14 modifies the state setting of a web instant messaging program displayed by the surrounding audio device and/or television (i.e., the surrounding device) from the original setting value (for example, an online state) to the busy state or the leave state.

In other examples, the setting can be an operation setting, and the target setting value can be a turn-off state. In detail, when the determination module 13 determines that the communication device 10 receives a call notification, the setting module 14 modifies the operation setting of a surrounding vacuum cleaner, a gas stove or an electromagnetic oven (i.e., the surrounding device) from the original setting value (for example, an operating state) to the turn-off state.

In other examples, the setting can be a notification setting, and the target setting value can be a vibration notification. In detail, when the determination module 13 determines that the communication device 10 receives a call notification, the setting module 14 modifies the notification setting of the surrounding device from the original setting value (for example, au audio notification or any notification with a sound) to the vibration notification. In the other examples, the target setting value can also be a light notification or any notification without a sound, or even no notification.

Figure 3:
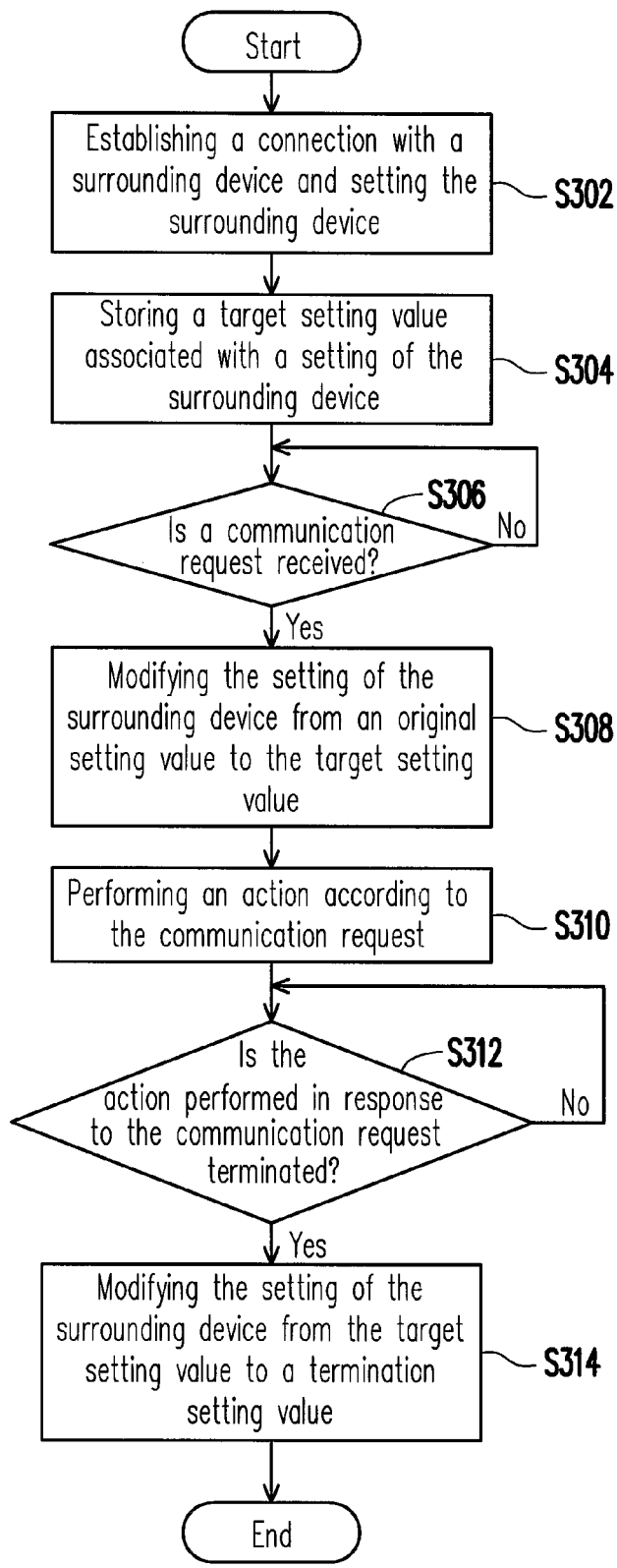
FIG. 3 is a flowchart illustrating a method for controlling a surrounding device according to a second example of the invention.

FIG. 3 is a flowchart illustrating a method for controlling a surrounding device according to a second example of the invention. The flowchart of FIG. 3 is similar to the flowchart of FIG. 2, though the flowchart of FIG. 3 is added with steps S310-S314. Since steps S302-S308 are similar to the steps S204-S208 of FIG. 2, detailed descriptions thereof are not repeated herein.

Referring to FIG. 1 and FIG. 3, in the present example, in addition to the original setting value associated with the setting of the surrounding device is stored, the storage unit 12 further stores a termination setting value associated with the setting of the surrounding device. In an example, the termination setting value can be the same to the original setting value, in detail, before the setting module 14 modifies the setting of the surrounding device from the original setting value to the target setting value, the communication device 10 obtains the original setting value through the communication module 11, and stores the original setting value in the storage unit 12. In other examples, the termination setting value can be different to the original setting value (which is, for example, set by the user).

Different from the flowchart of FIG. 2, in the flowchart of FIG. 3, in the step S310, the communication device 10 performs an action according to the communication request. The action is, for example, to establish a phone call connection (i.e., the user presses a call key), or continually send a call notification (i.e., the user does not perform any operation).

In step S312, the determination module 13 determines whether the action performed in response to the communication request is terminated, for example, determines whether the phone call is ended (i.e., whether the user presses an end call key). If not, the step S312 is returned, and if yes, a step S314 is executed.

In the step S314, the setting module 14 modifies the setting of the surrounding device from the target setting value to the termination setting value. As described above, the termination setting value can be the same or different from the original setting value.

Figure 4:
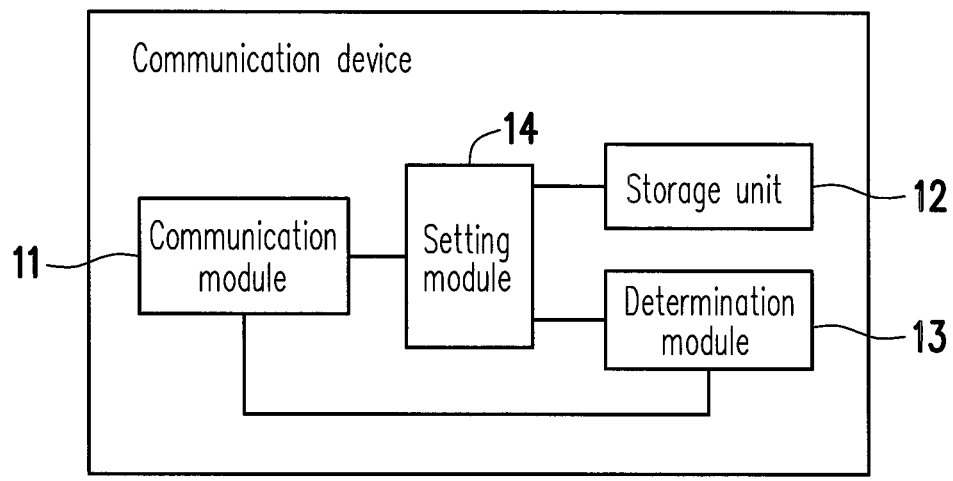
FIG. 4 is a functional block diagram of a communication device according to a third example of the invention.

FIG. 4 is a functional block diagram of a communication device 40 according to a third example of the invention. Referring to FIG. 4, the communication device 40 is similar to the communication device 10, though in addition to be connected to the setting module 14, the determination module 13 is further connected to the communication module 11.

Figure 5:
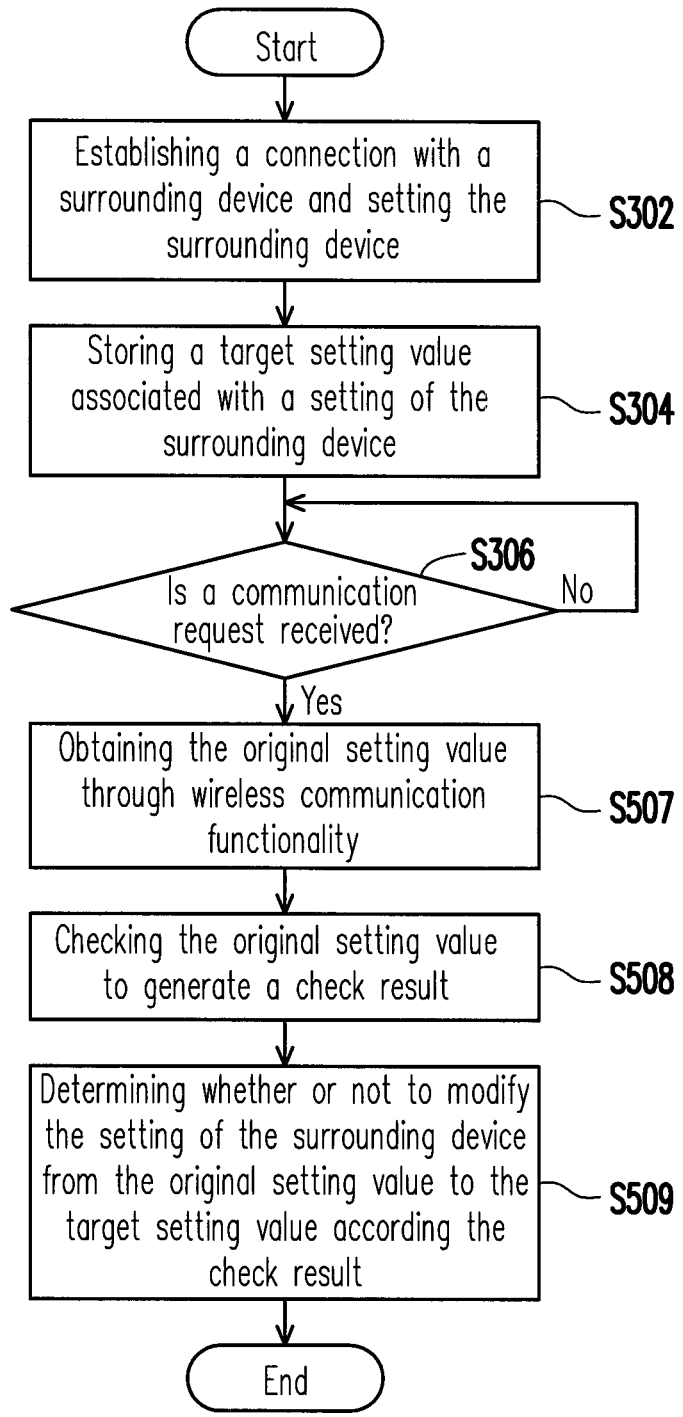
FIG. 5 is a flowchart illustrating a method for controlling a surrounding device according to the third example of the invention.

FIG. 5 is a flowchart illustrating a method for controlling a surrounding device according to the third example of the invention. The flowchart of FIG. 5 is similar to the flowchart of FIG. 3, and a difference therebetween is that steps S507-S509 are added in FIG. 5 to replace the step S308.

Referring to FIG. 4 and FIG. 5, after the step S306, the step S507 is executed, by which before the setting module 14 modifies the setting of the surrounding device from the original setting value to the target setting value, the communication module 11 obtains the original setting value through the wireless communication function. In the step S508, the determination module 13 checks the original setting value to generate a check result. In step S509, the setting module 14 determines whether or not to modify the setting from the original setting value to the target setting value according the check result.

For example, the setting of the surrounding device is an audio volume setting, the determination module 13 checks whether the original setting value includes an audio notification, and the setting module 14 determines whether or not to modify the setting of the surrounding device from the original setting value to the target setting value according the check result. In detail, when the original setting value includes the audio notification, the setting module 14 modifies the notification setting from the original setting value to the target setting value (for example, the vibration notification, the light notification or a combination thereof, or no notification). Conversely, when the original setting value does not include the audio notification, the notification setting is maintained unchanged (i.e. the original setting value of the setting of the surrounding device is unchanged).

Figure 6:
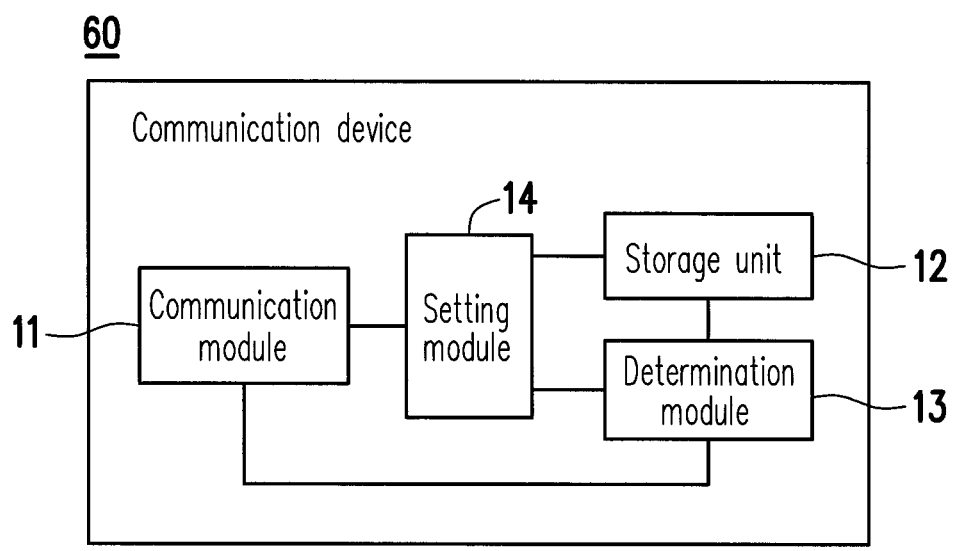
FIG. 6 is a functional block diagram of a communication device according to a fourth example of the invention.

FIG. 6 is a functional block diagram of a communication device 60 according to a fourth example of the invention. Referring to FIG. 6, the communication device 60 is similar to the communication device 10, though in addition to connecting the setting module 14, the determination module 13 is further connected to the communication module 11 and the storage module 12.

Figure 7:
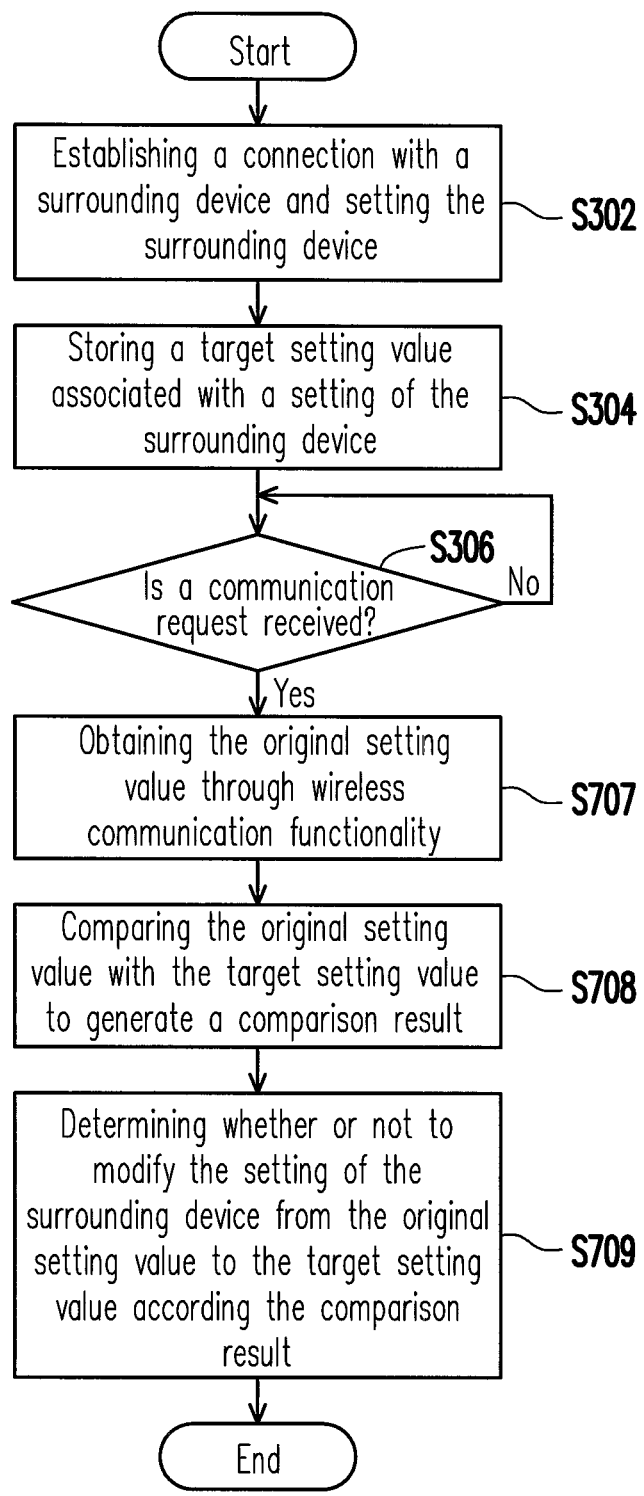
FIG. 7 is a flowchart illustrating a method for controlling a surrounding device according to the fourth example of the invention.

FIG. 7 is a flowchart illustrating a method for controlling a surrounding device according to the fourth example of the invention. The flowchart of FIG. 7 is similar to the flowchart of FIG. 3, and a difference therebetween is that steps S707-S709 are added in FIG. 7 to replace the step S308.

Referring to FIG. 6 and FIG. 7, after the step S306, the step S707 is executed, by which before the setting module 14 modifies the setting of the surrounding device from the original setting value to the target setting value, the communication module 11 obtains the original setting value through the wireless communication function. In the step S708, the determination module 13 compares the original setting value with the target setting value to generate a comparison result. In step S709, the setting module 14 determines whether or not to modify the setting from the original setting value to the target setting value according the comparison result.

For example, the setting of the surrounding device is an audio volume setting, the determination module 13 compares whether the original setting value is greater than the target setting value, and the setting module 14 determines whether or not to modify the setting of the surrounding device from the original setting value to the target setting value according a comparison result. In detail, when the original setting value is greater than the target setting value, the setting module 14 modifies the audio volume setting from the original setting value to the target setting value. Conversely, when the original setting value is smaller than or equal to the target setting value, the setting module 14 maintains the volume setting unchanged (i.e., the original setting value of the setting of the surrounding device is unchanged).

Figure 8:
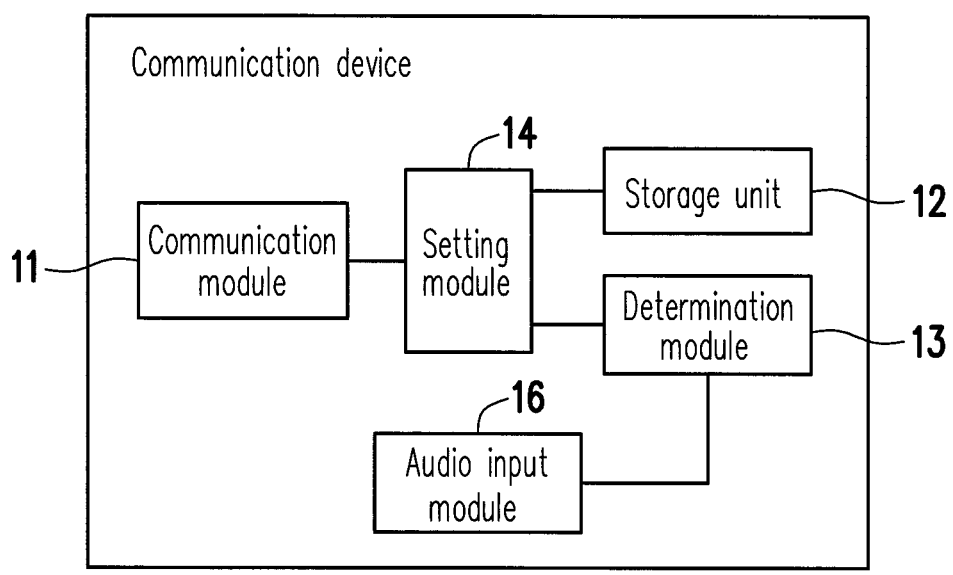
FIG. 8 is a functional block diagram of a communication device according to a fifth example of the invention.

FIG. 8 is a functional block diagram of another communication device 80 according to a fifth example of the invention. Referring to FIG. 8, the communication device 80 is similar to the communication device 10, but the communication device 80 further includes an audio input module 16 connected to the determination module, which is configured for detecting a background noise value of the communication device 80.

Figure 9:
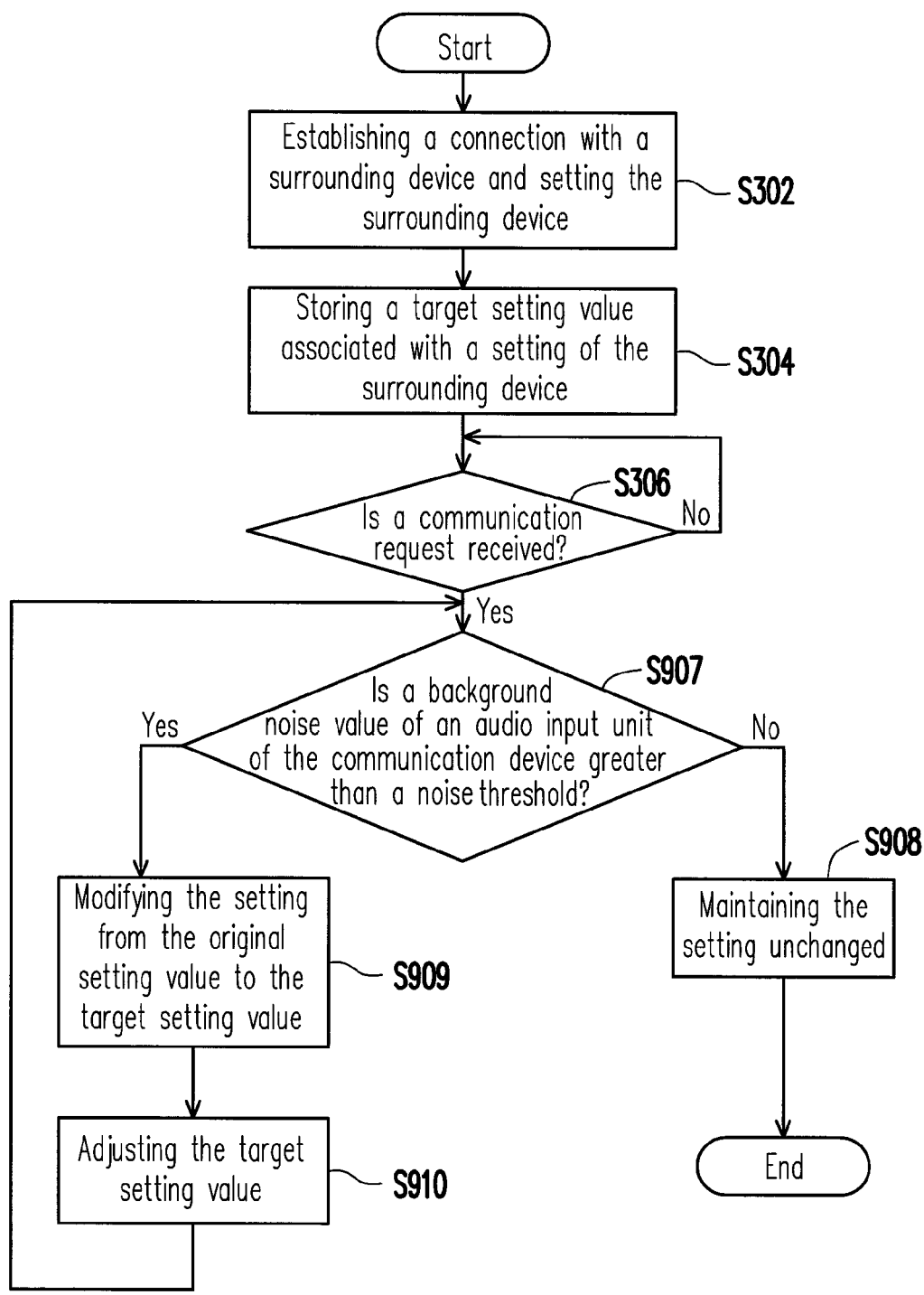
FIG. 9 is a flowchart illustrating a method for controlling a surrounding device according to the fifth example of the invention.

FIG. 9 is a flowchart illustrating a method for controlling a surrounding device according to the fifth example of the invention. The flowchart of FIG. 9 is similar to the flowchart of FIG. 3, and a difference therebetween is that steps S907-S909 are added in FIG. 9 to replace the step S308. Referring to FIG. 8 and FIG. 9, after the step S306, the step S907 I executed, by which the determination module 13 compares the background noise value detected by the audio input unit 16 with a noise threshold.

In the step S907, if the determination module 13 determines that the background noise value is smaller than the noise threshold (for example, 30 dB), the step S908 is executed, and in the step S908, the setting muddle 14 maintains the setting of the surrounding device unchanged.

In the step S907, if the determination module 13 determines that the background noise value is greater than or equal to the noise threshold, the steps S909 and S910 are executed. In the step S909, the setting module 14 modifies the setting of the surrounding device from the original setting value to the target setting value. In the step S910, the setting module 14 changes the target setting value in the storage device 12. For example, when the setting of the surrounding device is an audio volume setting, in the step S910, the setting module 14 lowers the target setting value, namely, a next target setting value is smaller than the current target setting value. Then, the step S907 is returned.

In the fifth example, the communication device 80 can gradually adjust the setting of the surrounding device until the background noise value is smaller than or equal to the noise threshold, but the invention is not limited thereto. In another example, after the step S909 is completed, the flowchart is directly ended (for example, the target setting value is a mute setting).

According to the above steps S907-S910, a check procedure is performed before modifying the setting of the surrounding device, though the invention is not limited thereto. In another example, the setting module 14 can first modify the setting of the surrounding device, and then the determination module 13 performs the check procedure to determine the background noise value.

The invention provides a computer-readable medium, and the computer-readable medium stores a computer executable program, which is configured for executing various steps of the aforementioned method for controlling the surrounding device. The computer-readable medium is composed of a plurality of program instructions (for example, an organization chart establishing program instruction, a table approving program instruction, a setting program instruction, and a deployment program instruction, etc), and these program instructions are loaded into the communication device and executed by the same to accomplish various steps of the method for controlling the surrounding device and various functions of the communication device.

In summary, a plurality of examples of the invention provides the method for controlling the surrounding device and the communication device and the computer-readable medium using the same. In the method, a connection with the surrounding device is established through a wireless communication function and a target setting value is set. When the communication device receives a communication request, by setting the target setting value, storing the original setting value and checking the original setting value or comparing the original setting value with the target setting value, and determining whether or not to modify the original setting value to the target setting value according to a check result or a comparison result, influence of the surrounding device on an action performed by the user in response to the communication request is automatically and effectively reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for controlling a surrounding device, adapted for a communication device, and the method for controlling the surrounding device comprising:
   establishing a connection with a surrounding device through a wireless communication function;
   storing a target setting value associated with a setting of the surrounding device;
   determining whether the communication device receives a communication request;
   modifying the setting of the surrounding device from an original setting value to the target setting value when the communication device receives the communication request;
   comparing a background noise value of a sound input unit of the communication device with a noise threshold;
   modifying the setting of the surrounding device from the original setting value to the target setting value when the background noise value is greater than the noise threshold; and
   maintaining the original setting value of the setting of the surrounding device unchanged when the background noise value is smaller than the noise threshold.

2. The method for controlling the surrounding device as claimed in claim 1, wherein the setting is an audio volume setting, and the target setting value is a mute setting.

3. The method for controlling the surrounding device as claimed in claim 1, wherein the setting is a play setting and the target setting value is a pause play state.

4. The method for controlling the surrounding device as claimed in claim 1, wherein the setting is a state setting and the target setting value is one of a busy state and a leave state.

5. The method for controlling the surrounding device as claimed in claim 1, wherein the setting is an operation setting and the target setting value is a turn-off state.

6. The method for controlling the surrounding device as claimed in claim 1, wherein the setting is a notification setting and the target setting value is a vibration notification.

7. The method for controlling the surrounding device as claimed in claim 1, further comprising:
   modifying the setting of the surrounding device from the target setting value to a termination setting value when the communication device completes an action performed in response to the communication request.

8. The method for controlling the surrounding device as claimed in claim 7, further comprising:
obtaining the original setting value of the surrounding device through the wireless communication function; and
the step of modifying the setting of the surrounding device from the target setting value to the termination setting value comprising:
modifying the setting of the surrounding device from the target setting value to the original setting value.

9. The method for controlling the surrounding device as claimed in claim 1, wherein before the step of modifying the setting of the surrounding device from the original setting value to the target setting value, the method further comprises:
obtaining the original setting value of the surrounding device through the wireless communication function;
comparing the original setting value with the target setting value to generate a comparison result; and
determining whether or not to modify the setting of the surrounding device from the original setting value to the target setting value according to the comparison result.

10. The method for controlling the surrounding device as claimed in claim 9, wherein the setting is an audio volume setting, and the step of comparing the original setting value with the target setting value to generate the comparison result comprises:
checking whether the original setting value is greater than the target setting value; and
the step of determining whether or not to modify the setting of the surrounding device from the original setting value to the target setting value according to the comparison result comprises:
modifying the volume setting from the original setting value to the target setting value when the original setting value is greater than the target setting value; and
maintaining the volume setting unchanged when the original setting value is smaller than or equal to the target setting value.

11. The method for controlling the surrounding device as claimed in claim 1, wherein the setting is a notification setting, and the step of checking the original setting value to generate the check result comprises:
checking whether the original setting value comprises an audio notification; and
the step of determining whether or not to modify the setting of the surrounding device from the original setting value to the target setting value according to the check result comprises:
modifying the notification setting from the original setting value to the target setting value when the original setting value comprises the audio notification; and
maintaining the notification setting unchanged when the original setting value does not comprise the audio notification.

12. The method for controlling the surrounding device as claimed in claim 1, wherein before the step of modifying the setting of the surrounding device from the original setting value to the target setting value, the method further comprises:
obtaining the original setting value of the surrounding device through the wireless communication function;
checking the original setting value to generate a check result; and
determining whether or not to modify the setting of the surrounding device from the original setting value to the target setting value according to the check result.

13. A communication device, adapted for controlling a surrounding device, and the communication device comprising:
a communication module, establishing a connection with the surrounding device through a wireless communication function;
a storage unit, storing a target setting value associated with a setting of the surrounding device;
a determination module, determining whether the communication device receives a communication request;
a setting module, connected to the communication module, the storage unit and the determination module; and
a sound input unit, connected to the determination module, detecting a background noise value,
wherein when the determination module determines that the communication device receives the communication request, the setting module modifies the setting of the surrounding device from an original setting value to the target setting value stored in the storage unit, and wherein the determination module compares the background noise value with a noise threshold;
when the determination module determines that the communication device receives the communication request, and the background noise value is greater than the noise threshold, the setting module modifies the setting of the surrounding device from the original setting value to the target setting value; and
when the determination module determines that the communication device receives the communication request, and the background noise value is smaller than the noise threshold, the setting module maintains the original setting value of the setting of the surrounding device unchanged.

14. The communication device as claimed in claim 13, wherein:
the storage unit stores a termination setting value;
the communication device performs an action in response to the communication request; and
when the communication device completes the action, the setting module modifies the setting from the target setting value to the termination setting value.

15. The communication device as claimed in claim 14, wherein:
before the setting module modifies the setting of the surrounding device from the original setting value to the target setting value, the communication module obtains the original setting value through the wireless communication function;
the storage unit stores the original setting value as the termination setting value; and
when the communication device completes the action, the setting module modifies the setting of the surrounding device from the target setting value to the original setting value.

16. The communication device as claimed in claim 13, wherein:
before the setting module modifies the setting of the surrounding device from the original setting value to the target setting value, the communication module obtains the original setting value through the wireless communication function;
the determination module compares the original setting value with the target setting value to generate a comparison result; and the setting module determines whether or not to modify the setting from the original setting value to the target setting value according to the comparison result.

17. The communication device as claimed in claim 16, wherein:
the setting is an audio volume setting;
when the determination module compares the original setting value with the target setting value to generate the comparison result, the determination module checks whether the original setting value is greater than the target setting value; and
when the setting module determines whether or not to modify the setting of the surrounding device from the original setting value to the target setting value according to the comparison result:
when the original setting value is greater than the target setting value, the setting module modifies the volume setting from the original setting value to the target setting value; and
when the original setting value is smaller than or equal to the target setting value, the setting module maintains the volume setting unchanged.

18. The communication device as claimed in claim 13, wherein:
the setting is a notification setting;
when the determination module checks the original setting value to generate the check result, the determination module checks whether the original setting value comprises an audio notification; and
when the setting module determines whether or not to modify the setting of the surrounding device from the original setting value to the target setting value according to the check result:
when the original setting value comprises the audio notification, the setting module modifies the notification setting from the original setting value to the target setting value; and
when the original setting value does not comprise the audio notification, the setting module maintains the notification setting unchanged.

19. The communication device as claimed in claim 13, further comprising:
a sound input unit, connected to the determination module, detecting a background noise value, wherein:
the determination module compares the background noise value with a noise threshold;
when the determination module determines that the communication device receives the communication request, and the background noise value is greater than the noise threshold, the setting module modifies the setting of the surrounding device from the original setting value to the target setting value; and
when the determination module determines that the communication device receives the communication request, and the background noise value is smaller than the noise threshold, the setting module maintains the original setting value of the setting of the surrounding device unchanged.

20. A non-transitory computer-readable medium storing a computer executable program, wherein when the computer executable program is loaded to a communication device, the communication device executes the following steps:
establishing a connection with a surrounding device through a wireless communication function;
storing a target setting value associated with a setting of the surrounding device;
determining whether the communication device receives a communication request;
modifying the setting of the surrounding device from an original setting value to the target setting value when the communication device receives the communication request;
comparing a background noise value of a sound input unit of the communication device with a noise threshold;
modifying the setting of the surrounding device from the original setting value to the target setting value when the background noise value is greater than the noise threshold; and
maintaining the original setting value of the setting of the surrounding device unchanged when the background noise value is smaller than the noise threshold.

* * * * *